United States Patent
Reinisch et al.

(10) Patent No.: US 7,069,105 B2
(45) Date of Patent: Jun. 27, 2006

(54) PROCESS MODULE FOR A HANDLING STATION, HANDLING STATION AND PROCEDURE FOR THE LINE-UP OF A HANDLING STATION

(75) Inventors: Hubert Reinisch, Freiberg (DE); Max Rosskopf, Freiberg (DE); Markus Langenbacher, Ludwigsburg (DE)

(73) Assignee: teamtechnik Maschinen und Anlagen GmbH, Freiberg (DE)

( * ) Notice: Subject to any disclaimer, the term of this patent is extended or adjusted under 35 U.S.C. 154(b) by 336 days.

(21) Appl. No.: 09/809,535

(22) Filed: Mar. 15, 2001

(65) Prior Publication Data

US 2002/0056606 A1  May 16, 2002

(30) Foreign Application Priority Data

Mar. 15, 2000 (DE) .................. 100 12 579

(51) Int. Cl.
  *G06F 19/00* (2006.01)
(52) U.S. Cl. ............. 700/169; 700/181; 700/253; 700/9; 700/20; 700/86
(58) Field of Classification Search .......... 700/20, 700/76, 88, 96, 9, 181, 253, 169; 710/33; 717/177

See application file for complete search history.

(56) References Cited

U.S. PATENT DOCUMENTS

| | | | | |
|---|---|---|---|---|
| 4,443,865 A | * | 4/1984 | Schultz et al. | 712/242 |
| 4,616,337 A | * | 10/1986 | Sheth | 710/35 |
| 4,972,365 A | * | 11/1990 | Dodds et al. | 710/5 |
| 5,479,618 A | * | 12/1995 | Van de Steeg et al. | 700/23 |
| 5,541,810 A | * | 7/1996 | Donhauser et al. | 361/686 |
| 6,038,486 A | * | 3/2000 | Saitoh et al. | 700/96 |

FOREIGN PATENT DOCUMENTS

| | | |
|---|---|---|
| DE | 39 38 517 C2 | 1/1992 |
| DE | 689 28 311 T2 | 4/1998 |
| EP | 0 358 292 B1 | 9/1997 |

\* cited by examiner

*Primary Examiner*—Anthony Knight
*Assistant Examiner*—Thomas Pham
(74) *Attorney, Agent, or Firm*—Harness, Dickey & Pierce P.L.C.

(57) ABSTRACT

A process module for a processing station (18) for performing a predetermined function. The module comprises a controller (60) associated with a program control unit (76; 76') to which a program for controlling the process module is supplied. The controller (60) comprises a program data administrator unit (74) which co-ordinates the transfer of the program associated with the process module (30) out of a program data memory (72, 72', 72") into the program control unit (76, 76'). The invention also relates to a processing station with at least one such process module (30) for performing a predetermined function, as well as a method for starting up such a processing station.

25 Claims, 3 Drawing Sheets

PROCESS MODULE FOR A HANDLING STATION, HANDLING STATION AND PROCEDURE FOR THE LINE-UP OF A HANDLING STATION

BACKGROUND

The present invention relates to a process module for a processing station for performing a predetermined function, comprising a controller associated with a program control unit which runs a program for controlling the process module. The invention also relates to a processing station with at least one such process module and a bus system for transmitting data to the controller of the process module. The invention also relates to a method for starting up such a processing station.

A processing station of the mentioned type is disclosed for example in the German patent application DE 197 41 671 A1. Such processing stations are normally part of a modular processing, assembly and testing system for the processing, assembly and testing of products. Each processing station within the assembly system has at least one given function to be carried out on the product. For example, the function can be the connection of two parts of a housing. Another function may be the marking of a housing part with a laser. These functions are automatically performed in the processing stations. In addition, an assembly system also comprises for example manual processing stations, where the functions are manually performed, as well as pure transfer stations which only convey pallets carrying the products.

Processing stations are shown in the above-mentioned document having several so-called process modules. These process modules are each separate devices for carrying out a separate function. Since a processing station can have several such process modules, it is possible for the processing station to carry out several functions.

Due to the modular construction, the process modules can be built into and removed from the processing station with little effort. Apart from plugging in the necessary connections for supply media, such as compressed air, electricity, etc., it is necessary for starting up the module to read in the program (software module) for controlling the function into a central basis controller of the processing station, where it is then run together with the other programs for the other process modules. The basis controller for example is a so-called SPS. The program is read in through a notebook, which is connected to the basis controller.

Although this procedure is fast and simple in practice, the need still exists for further simplifying the installation of process modules. In particular, the installation should be so simple that it can be readily carried out even by unskilled personnel, i.e. it should have a so-called "plug and work" functionality.

The German patent application DE 199 06 341 A1 discloses a method for loading a program in peripheral computers for peripheral devices in the printing industry. The German patent DE 195 06 957 C2 discloses a method for updating and loading application programs in a memory of a microprocessor system. The German patent application DE 196 24 929 A1 discloses a process automation system and the German patent application DE 196 15 190 A1 discloses a network based controller for industrial plants.

In view of the above, the object of the invention is to improve the process module of the mentioned type such that it can be rapidly and simply installed also by unskilled personnel. A further object of the invention is to simplify testing and servicing tasks.

SUMMARY OF THE INVENTION

The mentioned objects are achieved with the process module of the mentioned type in that the controller comprises a program data administrator unit, which co-ordinates the transfer of the program associated with the process module out of a program data memory into the program control unit. The advantage achieved is that the program necessary for controlling the process module (control program) no longer needs to be read in manually by the operating personnel, but this procedure is automatically carried out after connecting the process module to the processing station. Thus, the process module has enough "intelligence" that it can directly transmit the program to the program control unit for running the program or at least can transmit information as to where the program is located.

The possibility of automatically transferring the program necessary for control of the process module leads to a distinct simplification of the structure of the processing station, so that not only time, but money can be saved, which was previously required for a technician for start-up.

As already mentioned, the transmission of the program is coordinated by the program data administrator unit. The term "co-ordination" in this respect is to be understood in the simplest case in that the program data administrator unit contains the information which is necessary for example for the basis controller to find the memory location of the program and to then transfer the program out of the memory into the program control unit. The program data administrator unit in this case plays a passive role. In the broadest sense, the term "co-ordination" however is to be understood in that the program data administrator unit actively removes the desired program from the program data memory and transfers it to the program control unit. It will be understood that intermediate solutions are also possible. The control program thus can be loaded from different sources, for example from a memory in the process module, from the Internet, from a disk, CD-ROM, etc.

In a preferred embodiment, the controller of the process module comprises the program data memory. The feature has the advantage that the process module includes all software and hardware components which in the end are necessary for startup and operation of the process module. It is also very simple to test this process module, also outside of the processing station. The person carrying out the tests need not be concerned for example whether the program used in the tests corresponds to the program used or to be used in the processing station. Rather, access is made to the program stored in the program data memory, which is used in normal operation.

In a preferred embodiment, the controller of the process module comprises the program control unit, preferably configured as a microprocessor. In other words, this means that the controller within the process module comprises a microcomputer upon which the program runs. The feature has the advantage that functions for which time is critical can be carried out, because the program is no longer run in a central basis controller associated with all process modules together with other programs for the other process modules in a processing station.

The duration between the completion of the program and a new start of the program (time cycle of the program) is distinctly reduced. In addition, the program control unit can be optimised with respect to the program to be run, which not only leads to an improvement in the control of the process module, but also to certain cost advantages. In particular, it is no longer necessary to design the basis controller to account for running the most complex and the most time critical program. In addition, an autark process module is realised.

In a preferred embodiment, the program data administrator unit comprises a memory for storing data specific to the process module. In addition, the program data administrator unit is preferably connectable through a bus to the program data memory.

The data specific to the process module stored in the memory is for example an identification number of the process module, which among other things depends on the function to be performed, or is data on the memory location of the program, for example the memory address within the process module memory, or is an Internet address from which the program can be uploaded. Further product specific information is for example the location of the program control unit necessary for running the program, for example the process module or the basis controller.

As already mentioned, these data are necessary when the program data administrator unit works passively. In this case, the basis controller calls up the data through the bus and carries out the corresponding actions.

Alternatively, the program data administrator unit can operate actively, so that the transmission of program data is carried out directly by the unit to the program control unit without operation of the basis controller. In the best case, the basis controller can even be completely relinquished.

The object underlying the invention is also achieved by a processing station of the mentioned type, characterised in that the controller of the process module comprises a program data administrator unit which co-ordinates the transmission of the program associated with the process module out of a program data memory into the program control unit. The advantages explained in conjunction with the process module are also present here.

In a preferred embodiment, the preferably provided basis controller of the processing station includes the program control unit. That is, the programs necessary for controlling functions of the individual process modules run centrally in the basis controller, where preferably several microprocessors are provided, so that the programs run in parallel, i.e. simultaneously, and interruptions do not result due to the duration of the program cycle. It is also contemplated that the programs be run in a time sharing mode, quasi parallel on one microprocessor.

Depending on the application, the processing station can be equipped with several process modules, preferably up to a maximum of four process modules, so that the processing station itself can carry out a number of functions corresponding to the number of process modules.

In a preferred embodiment, the basis controller and/or the controller of a process module are configured such that they can establish a connection to the program data memory, which is located outside of the processing station, for example in the memory of a central control system, in a databank of a computer or on an Internet server.

This feature has the advantage that the program can be loaded, for example over the Internet from a server connected to the Internet, so that especially the care of the program and the installation of updates is greatly simplified. It will be understood that other data networks can be used for this purpose instead of the Internet.

The object underlying the invention is also achieved by a method for starting up a processing station with the above-mentioned features, which is characterised in that after connection of a process module to the processing station, preferably through an interface, the program for controlling the process module, depending on data specific to the process module stored in the program data administrator unit, is read out from the program data memory and transmitted to the program control unit. Preferably, the data specific to the process module comprise at least one of the following data: memory location of the program, location of the transmission target of the program and identification data of the process module. The above-described advantages are also realised by this method.

Further advantages and embodiments of the invention result from the following description and the attached drawings. It will be understood that the above-mentioned features and those to be described below are applicable not only in the given combinations but may be used in other combinations or taken alone without departing from the scope of the present invention.

BRIEF DESCRIPTION OF THE DRAWINGS

The invention will now be described in more detail in terms of an embodiment with reference to the drawings.

DETAILED DESCRIPTION

Figure 1:
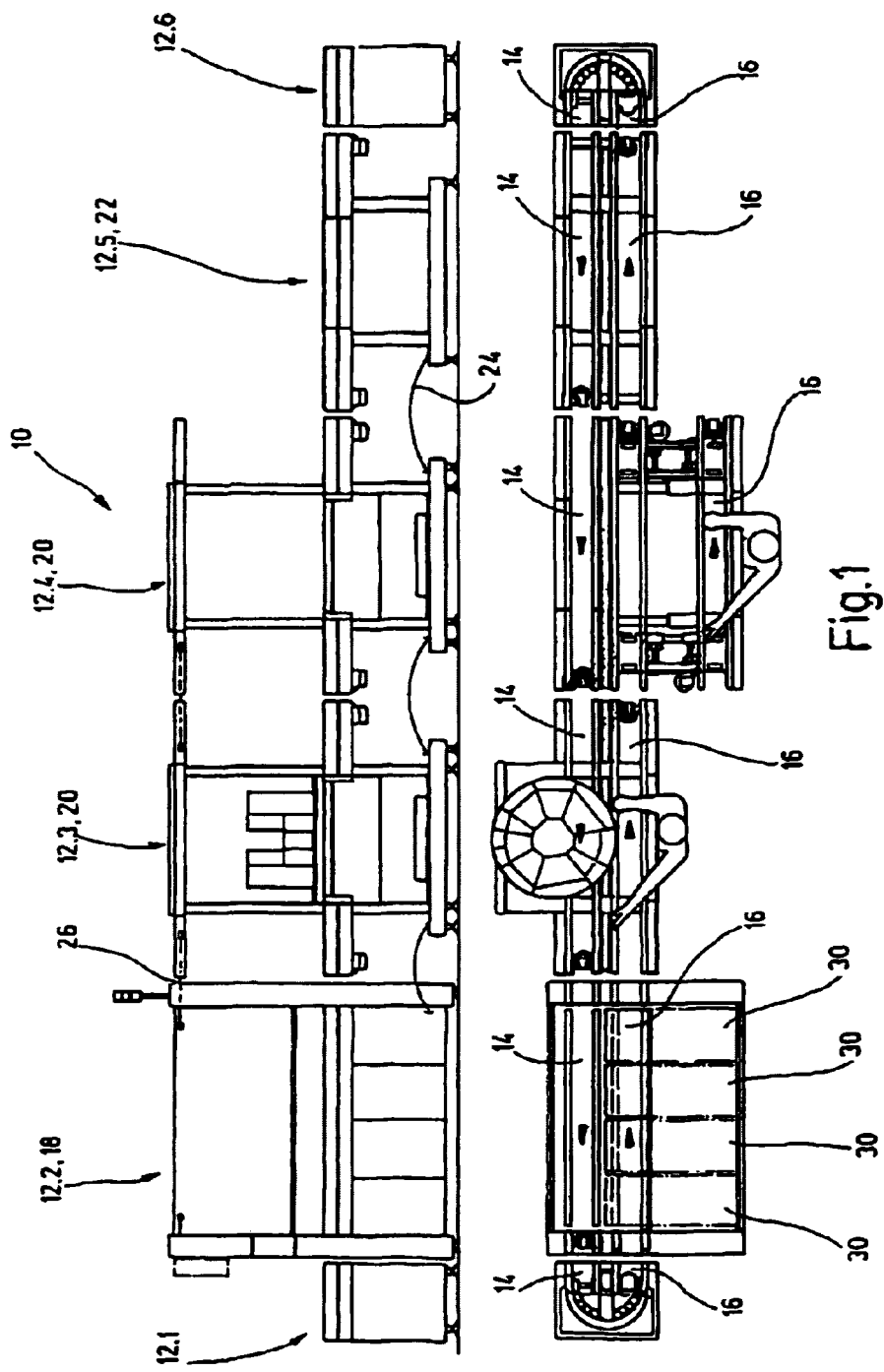
FIG. 1 shows a schematic illustration in side and plan view of a complete processing station and a processing, testing and assembly facility.

An assembly system or processing facility is shown in FIG. 1 with the numeral 10. The processing facility 10 is shown in side view in the upper illustration and in plan view in the lower illustration. The processing facility 10 comprises several units 12.1 to 12.6 arranged in series. The number of six units is exemplary and this is not a limitation in practice. Rather, the processing facility can consist of more or fewer than six units, which need not be arranged in a line, but can be provided in other geometrical forms.

Each of the units 12.1 to 12.6 comprises two parallel conveyor sections, which are indicated with the numerals 14, 16 in the lower plan view. The two conveyor sections 14, 16 provided in the units 12.1 to 12.6 comprise counter directional transport devices. The conveyor sections 14, 16 of the units 12.1 to 12.6 are designed such that the transport of a pallet from one unit to the next unit is possible. To achieve a closed conveyor system, the two units 12.1 and 12.6 arranged at the ends of the processing facility are provided with deflection or turn-around units, which connect the two conveyor sections 14, 16 of the neighbouring unit 12.2 or 12.5 to one another.

Such a processing facility 10 makes it possible to subject a work piece circulating on a pallet to a series of different processing steps. For this purpose, the units 12.2 to 12.5 are configured differently, because they are to achieve different purposes. The unit 12.2 is configured as an automatic processing station 18, the two units 12.3 and 12.4 as manual processing stations 20 and the unit 12.5 as a pure transfer station (buffer) 22.

Energy supply trains extend from unit to unit for supplying the individual units 12.1 to 12.6 with the necessary media, for example electricity, compressed air, etc. In the side view of FIG. 1, the compressed air or pneumatic supply line is indicated with the numeral 24, while the electrical supply train is indicated with the numeral 26. The pneumatic line 24 runs in the lower region of the units 12.1 to 12.6, while in contrast the electrical supply train 26 runs in the upper region of the units. The electrical supply train 26 contains not only lines for electric power supply, but also for example lines for a data bus. The connection of the two supply trains 24, 26 between the units is normally made with plug connectors, which are not shown in the figure for reasons of clarity.

The automatic processing station 18 provided in the processing facility 10 is capable of performing not only one function but several functions when needed. In this respect, a function will be understood as a working step performed on the work piece passing through the processing station. A working step for example can be a cutting or non-cutting processing of the work piece, the connection of the work piece with another part, the testing of the work piece for functionability, marking of the work piece with a laser or any other testing procedure or processing step.

Each of these functions or each of these working steps is referred to in the following as the process, where the automatic processing station 18 comprises a correspondingly designed process module for carrying out such processes. The process module is indicated in FIG. 1 with the numeral 30. As can be clearly seen in FIG. 1, the automatic processing station 18 comprises four such process modules 30. This number of four however is only an example. A smaller number of process modules is possible or possibly also a larger number of process modules.

Each process module 30 is self-contained and is functionally independent of the other process modules 30 present in a processing station 18. The installation of the electric and pneumatic lines of the process module 30 is prepared, so that it is only necessary to couple to the corresponding supply train, for example by means of normal plug connections.

Figure 2:
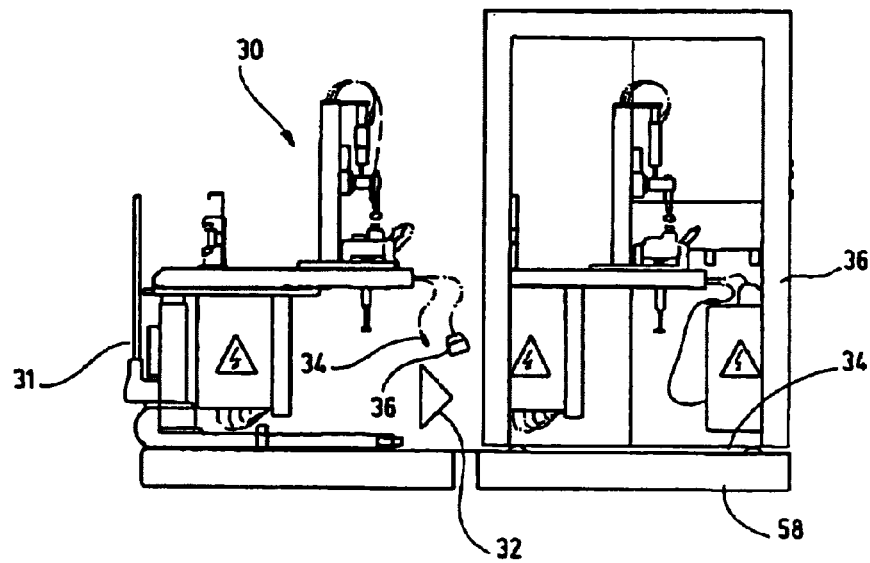
FIG. 2 shows a schematic illustration of an automatic processing station with exchangeable process modules.

FIG. 2 shows a process module in side view, which is supported on a platform 31. The arrow 32 indicates that the process module 30 can be driven into the processing station 18 and connected there to a correspondingly provided carrier unit (not shown). The carrier unit comprises supporting elements which carry the process module 30, as well as at least two positioning elements which provide for an exact positioning of the process module 30 within the processing station 18. The connection of the process module 30 to the supply trains 24, 26 is accomplished with schematically indicated plug connectors 34, 36.

This modular construction of the automatic processing station 18 allows a very flexible and simple adaptation to the requirements of the user of the processing facility 10. In addition, an adaptation or change of the automatic processing station 18 is possible at any time by exchanging the respective process module 30 with a module having another function.

As mentioned above, the connection of the process module 30 to the supply trains 24, 26 takes place with corresponding plug connectors 34, 36. To start up the process module 30, it is also necessary to install and start software components (referred to as program in the following) for controlling the process module 30 at the corresponding location. This procedure will now be described in conjunction with FIGS. 3 and 4.

Figure 3:
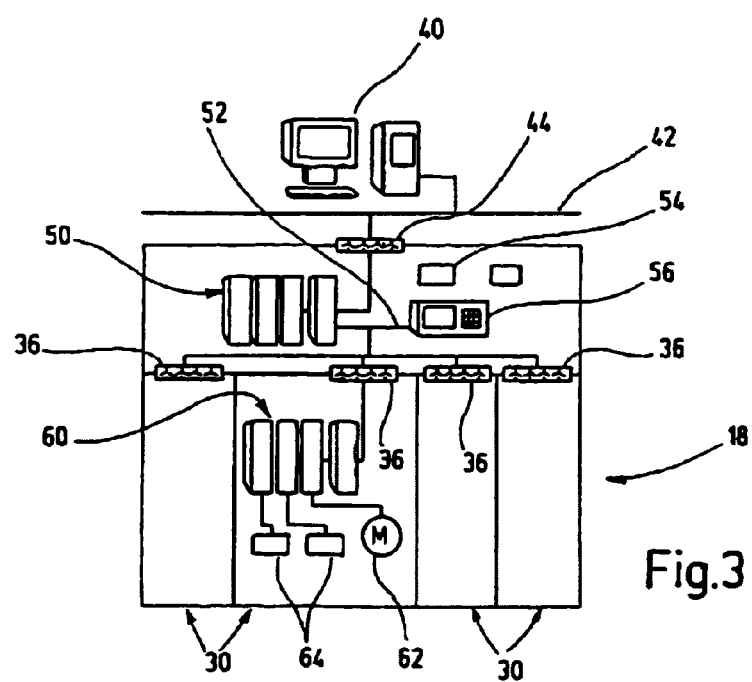
FIG. 3 shows a schematic illustration of the control structure of the processing facility.

FIG. 3 schematically illustrates a section of the control structure of the processing facility 10. The processing facility 10 optionally comprises a facility control or central control system 40, which handles overreaching and coordinating functions within the entire processing facility 10. This central control system contains among other things the configuration of the entire facility as well as the working sequence of the work pieces to be processed. The central control system 40 communicates with the individual units 12.1 to 12.6 through a data bus 42, which for example is configured as a profibus. The individual units 12.1 to 12.6 are connected to the data bus 42 by a plug connector 44, when necessary. As mentioned, the data bus 42 is part of the electric supply train 26, which extends through the entire processing facility 10.

FIG. 3 illustrates the control structure of the automatic processing station 18, which is connected to the data bus 42 by the plug connector 44. The processing station 18 comprises a basis or station controller 50 connected to an internal data bus 52. This basis controller 50, for example a SPS, has the purpose of carrying out the tasks assigned to the processing station 18. This includes for example shutting off the entire station when actuating an emergency OFF switch, which is indicated in FIG. 3 with the numeral 54. A further task of the basis controller 50 can be the communication over the data bus with the central control system 40 and also with other previous or prior units 12 of the processing facility 10.

The input and output of information, data or commands takes place through a station operating device 56, which is also connected to the internal data bus 52. This station operating device 56 comprises a display for indicating certain information, as well as a keyboard for inputting data. The station operating device 56 is ergonomically attached to an easily accessible location in the processing station 18. The basis controller 50 in contrast is contained in a housing, normally electro-magnetically shielded, which is indicated in FIG. 2 with the numeral 58. As mentioned, the processing station 18 is configured to receive several processing modules 30. To connect the process modules 30, a number of the mentioned plug connectors 36 are provided in the same number as the modules. In the present embodiment, the processing station 18 can receive four process modules 30, so that four plug connectors 36 are provided. For reasons of clarity, only the control structure for one process module 30 is shown in FIG. 3.

The process module 30 comprises a decentral input/output unit or controller 60 (process module controller), which is connected to the internal data bus 52. This process module controller 60 has the task of controlling the devices provided with the process module 30. Such devices include for example step motors, actuators, laser marking devices, measurement and testing devices, etc. A step motor 62 and two input/output interfaces 64 are illustrated in FIG. 3 only as an example, where the latter can for example serve to control a laser and to receive measured data.

A program is necessary for process control of the mentioned devices in a process module 30, which is contained either in the process module controller 60 or in the basis controller 50. In the first case, the process module controller 60 has a corresponding program control unit 76. If the program runs in the basis controller 50, the corresponding control commands are transmitted over the internal data bus 52 to the process module controller 60. Since the basis controller 50 is responsible for all process modules 30 connected to the processing station 18, the different programs of the process modules 30 in this case are carried out sequentially, so that problems can arise with functions of a process module 30 which are critical with respect to time. This situation can be alleviated by providing several program control units 76, i.e. microcomputers, in the basis controller 50 (multiprocessor system), apart from the mentioned placement of the program control unit 76 in the respective process module 30.

With reference to the schematic illustration in FIG. 4A, the structure of the process module controller 60 will be described in the following as well as how the program necessary for control reaches the program control units 76. For simplification, the parts already discussed in conjunction with FIG. 3 have the same reference numerals in FIG. 4A, so that a detailed description need not be repeated.

Each process module 30 comprises a process module controller 60 which includes among others a control unit 70, a program memory 72 as well as a program data administrator unit 74. The program memory 72 is a non-volatile memory, for example in the form of a ROM, EE-PROM or a hard disk memory in which the necessary program for controlling the process module 30 is stored. The program data administrator unit 74 in the simplest case is a memory unit containing various data specific to the process module. For example, this data includes a name identifying the process module 30, a value indicating the location of the program and a value indicating the location of the program control unit 76 for executing the program.

In the present embodiment, the basis controller 50 comprises a program control unit 76. Furthermore, the lower process module 30 in FIG. 4A comprises a program data unit 76', which is part of the process module controller 60.

Figure 4A:
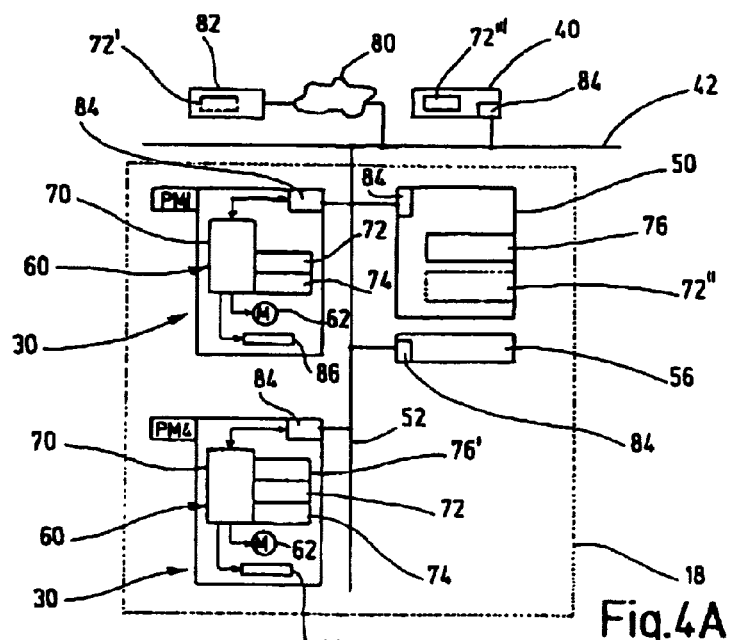
FIG. 4A shows a schematic block diagram of the control of a processing station.

As can be seen in FIG. 4A, the central control system 40 can be connected to the Internet 80 through a server 82, where the server 82 comprises a program memory 72'. As indicated with dashed lines, the basis controller 50 or the central control system 40 can also include program memories 72" and 72''', in which programs necessary for controlling the process module 30 are stored.

All of the units connected to the data bus 42 have interfaces 84 which control the communication over the data bus 42.

Figure 4B:
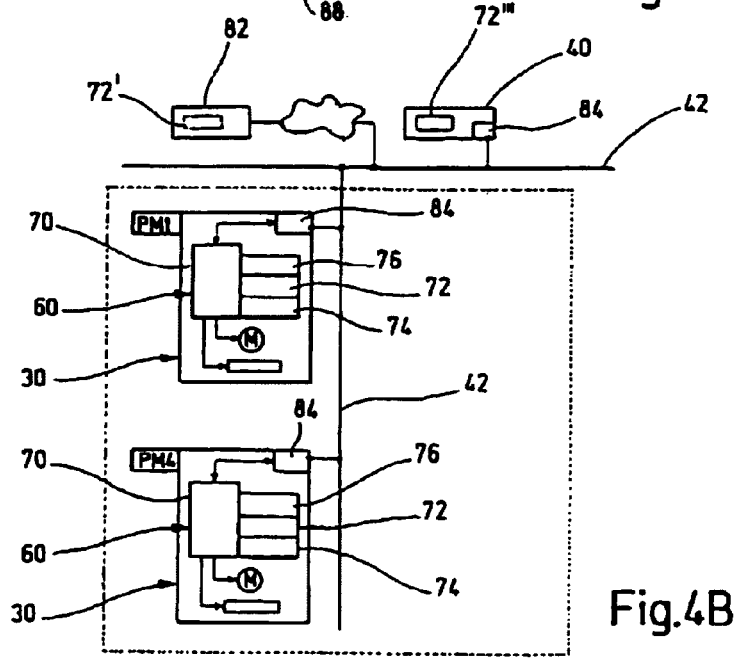
FIG. 4B shows a schematic block diagram of the control of a processing station of FIG. 4A, without a basis controller.

FIG. 4B illustrates a modification of the embodiment shown in FIG. 4A. For simplification, the same parts are indicated with the same reference numerals, so that a repeated description of these parts is not necessary. In contrast to the embodiment of FIG. 4A, this modification no longer comprises a basis controller 50. The functionality of the basis controller 50 is completely transferred to the process module 30 and/or the central control system 40. Due to this, each process module 30 has a program memory 72, a program data administrator unit 72 and a program control unit 76. This results in a completely decentralised structure of the entire system. The process modules 30 are therefore autark. The function itself however is not substantially changed with respect to the embodiment shown in FIG. 4A, only the data flow transmitted over the data bus 52 is reduced. In addition, the process modules 30 communicate over this data bus 52 both with one another and also with the central control system 40. Due to the small difference between the embodiments of FIGS. 4A and 4B, the start up of the process module 30 is described below in conjunction with the system shown in FIG. 4A. The functions of the basis controller 50 indicated there are performed decentrally in the embodiment of FIG. 4B, i.e. by the process module itself or for example by the central control system 40.

The start up of a process module 30 is accomplished as follows. The process module 30 or the process modules 30 are first placed in the processing station 18 and connected by the plug connectors 34, 36 to the supply trains 24, 26. When turning on the process module 30, the process module controller 60 accesses the basis controller 50 over the data bus 42 or over the internal data bus 52 (or the other process modules or the central control system 40, when no basis controller 50 is present as in FIG. 4B). The basis controller 50 (in FIG. 4B the process module controller 60 itself or the central control system 40) reads out the data stored in the program data administrator unit 74 and depending on the data transfers the program data out of the program memory 72 into the program control unit 76. Alternatively, and depending on the data stored in the program data administrator unit 74, the program can also be downloaded from the program memory 72', the program memory 72" or the program memory 72''' of the central control system 40, where in the first case, the central control system 40 establishes a connection to the Internet 80 over the server 82. It is also possible that the process module 30 could establish a connection to the Internet independently without the central control system 40. The information as to where the program is located is therefore found in the program data administrator unit 74 for each process module 30. In addition, the program data administrator unit 74 also indicates where the program control unit 76 is located. For example, the program control unit 76' in the lower process module 30 is part of the process module controller, so that the program is transferred out of the program memory 72 into the program control unit 76'.

The mentioned procedure of transferring the program out of the program memory 72 into the program control unit 76 runs automatically without action of an operator. In particular, it is no longer necessary that the program for controlling the process module 30 be loaded by an operating person from a notebook into the program control unit 76 and for example making program adaptations.

After the programs for the different process modules are loaded in the program control units 76' of the process modules 30, they are started and cyclically repeated. The programs then activate the step motor 62 of the process module 30, properly move the laser 86 for marking and provide for the reading out and analysis of data measured on a scale 88.

The program data administrator unit 74 has been described as a simple memory unit, which contains data specific to the process module. Alternatively, the program data administrator unit 74 can be an active unit, which undertakes the mentioned tasks of the basis controller 50, namely the transfer of the program out of the corresponding program memories 72 into the program control unit 76.

It will be understood that other task distributions between the program data administrator unit 74 and the basis controller 50 are possible. In conjunction with the present invention, it is only important that the program be automatically read out of the program memory 72 depending on the information stored in the program data administrator unit 74, where the program memory 72 is part of the processing facility 10.

In summary, it is found that the control structure of the process module 30 according to the invention leads to a distinct simplification of the start up procedure. It is no longer necessary for trained personnel to read in the necessary programs from a notebook, so that costs can be saved and on the other hand a possible source of error is eliminated (plug and work). Furthermore, each process module 30 has all of the necessary components for testing when located outside of the processing station 18.

The invention claimed is:

1. Process module for installation in a processing station having a basis controller for performing a predetermined function to a workpiece passing through the processing station, comprising a controller associated with a program control unit into which a program for controlling the process module is supplied wherein the program control unit is provided in the process module or in the basis controller of the processing station, characterized in that the controller includes a program data administrator unit which contains process module specific data which comprises data indicating the location of the program and data indicating whether the program is to be executed in the program control unit of either the process module or the basis controller and which coordinates the transfer of the program associated with the process module from a program data memory into the program control unit in accordance with the process module specific data contained in the program data administrator unit so that the process module and/or the processing station is/are automatically programmed when the process module is installed in the processing station.

2. Process module of claim 1, wherein the controller comprises the program data memory.

3. Process module of claim 1, wherein the controller comprises the program control unit.

4. Process module of claim 2, wherein the controller comprises the program control unit.

5. Process module of claim 1, wherein the program control unit is provided as a microprocessor.

6. Process module of claim 1, wherein program data administrator unit comprises a memory unit for storing data specific to the process module.

7. Process module of claim 1, wherein the program data administrator unit can be connected through a bus to the program data memory.

8. Processing station with at least one process module having a basis controller for performing a predetermined function to a workpiece passing through the processing station, where the process module comprises a controller associated with a program control unit into which a program for controlling the process module is supplied wherein the program control unit is provided in the process module or in the basis controller of the processing station and with a bus system for transferring data to the controller of the process module, characterized in that the controller includes a program data administrator unit which contains process module specific data which comprises data indicating the location of the program and data indicating whether the program is to be executed in the program control unit of either the process module or the basis controller which co-ordinates the transfer of the program associated with the process module from a program data memory into the program control unit in accordance with the process module specific data contained in the program data administrator unit so that the process module and/or the processing station is/are automatically programmed when the process module is installed in the processing station.

9. Processing station of claim 8, wherein a basis controller is provided and wherein the process module comprises an interface for connection to the basis controller.

10. Processing station of claim 9, wherein the basis controller comprises the program control unit.

11. Processing station of claim 8, wherein the program control unit is configured as a microcomputer.

12. Processing station of claim 8, wherein several process modules are provided and wherein the programs associated with the process modules are supplied to the program control unit.

13. Processing station of claim 12, wherein the program control unit comprises several microprocessors, so that the programs associated with the process modules are supplied to run in parallel on the different microprocessors.

14. Processing station of claim 13, wherein at least one of the microprocessors is provided in a controller of the process module.

15. Processing station of claim 8, wherein the basis controller and/or the controller are configured to establish a connection with the program data memory, which lies outside of the processing station.

16. Processing station of claim 15, wherein the connection to the program data memory takes place over the Internet, and wherein the program data memory is provided in a server connected to the Internet.

17. Method for starting up a processing station of claim 8, characterized in that after connection of a process module to the processing station via the interface, the program for controlling the process module is read out of the program data memory depending on the data specific to the process module stored in the program data administrator unit and is transferred to the program control unit.

18. Method of claim 17, wherein the data specific to the process module comprise at least one of the following data: storage location of the program, target location for the transfer of the program and identification data of the process module.

19. Process module for a processing station having a basis controller for performing a predetermined function to a workpiece passing through the processing station, comprising a controller associated with a program control unit to which a program for controlling the process module is supplied wherein the program control unit is provided in the process module or in the basis controller of the processing station, wherein the controller includes a program data administrator unit which contains process module specific data comprising data indicating the location of the program and data indicating whether the program is to be executed in the program control unit of either the process module or the basis controller and which coordinates the transfer of the program associated with the process module from a program data memory into the respective program control unit.

20. Process module of claim 19 wherein the controller further includes said program data memory.

21. Processing station with at least one process module for performing a predetermined function to a workpiece passing through the processing station and a basis controller coupled with said at least one process module, the process module comprising a controller associated with a program control unit to which a program for controlling the process module is supplied wherein the program control unit is provided in the process module or in the basis controller of the processing station, wherein the controller includes a program data administrator unit which contains process module specific which comprises data indicating the location of the program and data indicating whether the program is to be executed in the program control unit of either the process module or the basis controller and which coordinates the transfer of the program associated with the process module from a program data memory into the respective program control unit.

22. Processing station of claim 21 wherein the controller further includes said program data memory.

23. A processing station comprising one or more process modules for controlling one or more predetermined process functions in a manufacturing operation, said processing station including a basis controller for controlling the operation of said one or more process modules, and wherein each of said process modules comprises a process controller for controlling the performance of one of said predetermined process functions in accordance with a process control program, said process controller including a program data administrator unit which contains process module specific data indicating the location of the process control program and data indicating whether the program is to be executed in the basis controller or said process controller and which further coordinates the transfer of said process control program from a program data memory into said basis controller and/or said process controller in accordance with the process module specific data contained in the program data administrator unit so that the process module and/or the processing station is/are automatically programmed when said process module is installed in said processing station.

24. Process module for installation in a processing station comprising one or more process modules for controlling one or more predetermined process functions in a manufacturing operation, said processing station including a basis controller for controlling the operation of said one or more process modules, and wherein said process module comprises a process controller for controlling the performance of one of said predetermined process functions in accordance with a process control program, said process controller including a program data administrator unit which contains process module specific data indicating the location of the process control program and data indicating whether the process control program is to be executed in the basis controller or the process controller and which further coordinates the transfer of said process control program from a program data memory into said basis controller and/or said process controller in accordance with the process module specific data contained in the program data administrator unit so that the process module and/or the processing station is/are automatically programmed when said process module is installed in said processing station.

25. Processing station with at least one process module, the process module having means for performing a predetermined working step on a workpiece passing through the processing station, and a controller associated with a program control unit on which a program for controlling the process module is executed, and a bus system for transmitting data to the controller of the process module, characterized in that the program control unit is provided in the process module and/or the controller, the controller comprising a program data administrator unit provided as a memory in which process module specific data is stored, the data comprising at least one identification identifying the process module, a value indicating the location of the program and a value indicating whether the program is to be executed in the program control unit of either the process module or the basis controller, and the transmission of the program associated with the process module from the program data memory to the program control unit is coordinated dependent on the module specific data.

* * * * *